United States Patent [19]
Yarnell

[11] Patent Number: 4,531,422
[45] Date of Patent: Jul. 30, 1985

[54] TRANSMISSION SHIFT ROD INTERLOCK SYSTEM

[75] Inventor: James A. Yarnell, Temperance, Mich.

[73] Assignee: Dana Corporation, Toledo, Ohio

[21] Appl. No.: 527,460

[22] Filed: Aug. 29, 1983

[51] Int. Cl.³ .......................... G05G 5/06; F15B 15/26
[52] U.S. Cl. ........................................ 74/475; 74/346; 74/364; 92/27; 92/30; 192/3 N
[58] Field of Search ................ 74/346, 364, 475, 477; 92/23, 27, 28, 30; 192/3 R, 3 N

[56] References Cited

U.S. PATENT DOCUMENTS

| | | | |
|---|---|---|---|
| 2,167,790 | 8/1939 | Whitehead et al. | 74/346 X |
| 2,193,431 | 3/1940 | Probst | 74/326 |
| 2,402,842 | 6/1946 | Rhodes | 74/475 |
| 2,445,716 | 7/1948 | Sternberg | 74/745 |
| 2,529,393 | 11/1950 | Hogue | 74/334 |
| 2,828,642 | 4/1958 | Bernard | 74/472 |
| 2,902,873 | 9/1959 | Sundt | 74/364 |
| 3,033,171 | 5/1962 | Engelbrecht et al. | 92/27 X |

*Primary Examiner*—Allan D. Herrmann
*Attorney, Agent, or Firm*—F. B. McDonald

[57] ABSTRACT

A shift rod air interlock system provides a mechanical apparatus for insuring a neutral position in a two-speed air shifted compound transmission whenever air to an auxiliary air shift cylinder is interrupted. The apparatus prevents the transmission from being shifted into gear whenever an associated vehicle is stationary and when a power take-off unit is operative. In addition, a two-position air interlock plunger assembly provides a locking plunger which interfaces with a pair of detents in the shift rod, thus insuring that the auxiliary transmission is prevented from being shifted into neutral whenever the air system is interrupted while the vehicle is moving. In a preferred form, the invention utilizes a shift rod selectively movable between at least three positions, including an intermediate neutral position.

6 Claims, 3 Drawing Figures

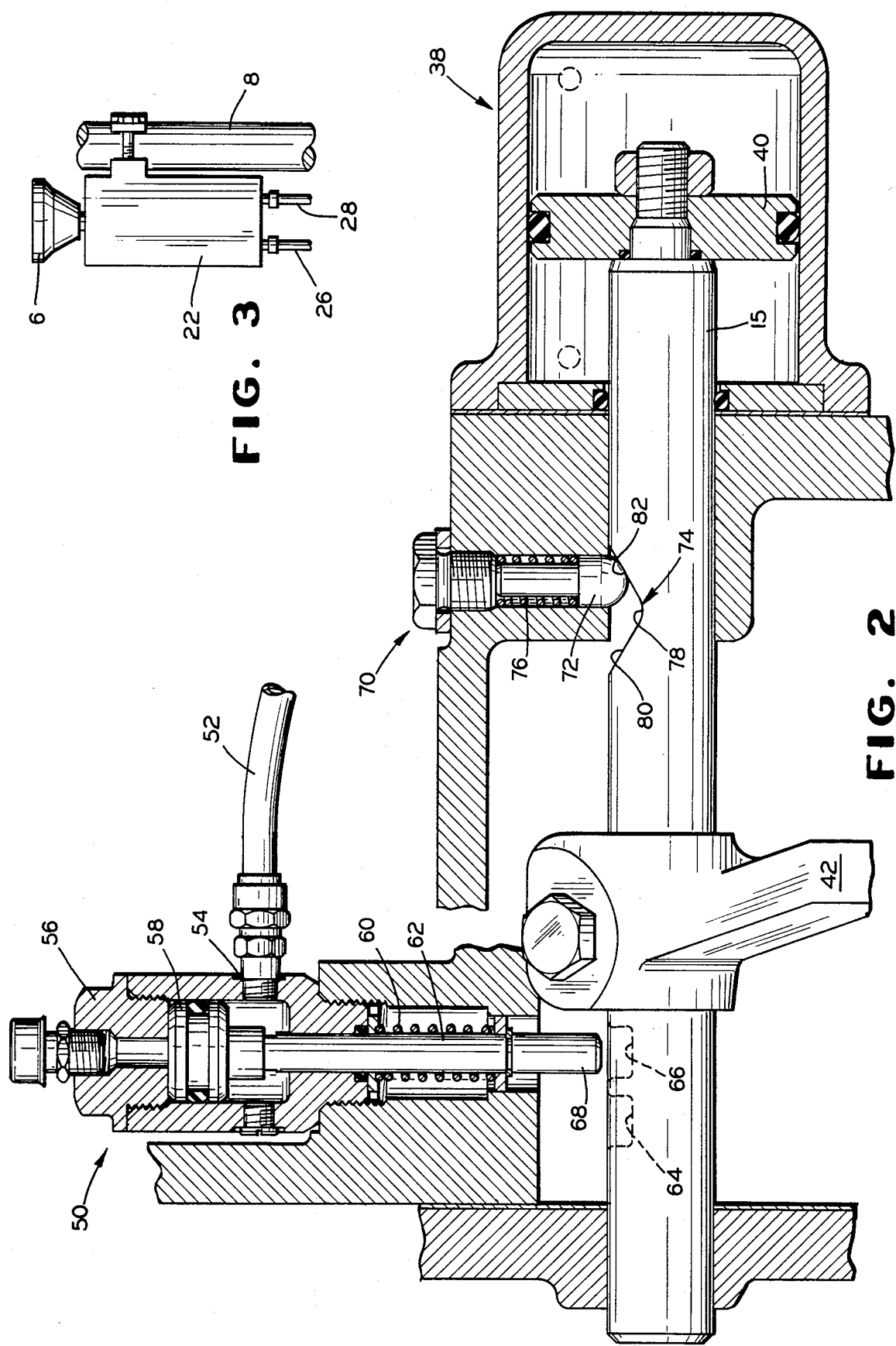

4,531,422

TRANSMISSION SHIFT ROD INTERLOCK SYSTEM

BACKGROUND OF THE INVENTION

This invention relates to safety interlocks for compound transmissions which include auxiliary gearboxes as utilized in heavy duty trucks and other vehicles. More particularly, the invention relates to control of movement of the shift rod of the auxiliary transmission.

Prior art auxiliary transmission devices have lacked certain desirable safety features. For example, there is often a potentially catastrophic possibility of an auxiliary transmission being shifted into gear upon failure of an air line during operation of a power take-off unit while the vehicle is stationary. Another related concern has been the possible shifting into neutral of an auxiliary transmission upon the failure of an air system while the vehicle is moving.

Several devices have been employed in the prior art which tend to alleviate at least one of these two conditions, although with some special effort being required by the operator of the vehicle. For example, a neutral interlock has been employed for assuring that the vehicle transmission will not shift out of neutral while the vehicle is stationary upon failure of air. However, the latter involves several somewhat complicated steps by the vehicle operator to effect the safety condition. In addition, extra apparatus is involved, as present structures utilize either a single 3-position air cylinder or two 2-position air cylinders to hold the transmission in neutral. What is needed is a simple, yet conveniently operated mechanism which will provide the desired combination of protections.

SUMMARY OF THE INVENTION

This invention provides a simple interlock system which combines the features of a neutral safety while a vehicle is stationary, and a positive gear lock-up during the time the vehicle is in motion.

In a preferred embodiment, the system is embodied in a gearbox having a shift rod selectively movable between at least three positions, including a neutral position intermediate the low and high gears of an auxiliary box. The system requires only one 2-position air cylinder in conjunction with a 2-position exhaust air shut-off valve. An air pressure source is applied to an air shift cylinder for moving the shift rod between respective positions. A plunger assembly provides a securement of the rod upon failure of air pressure to the cylinder while the rod is in either low or high gear during the movement of the vehicle. The plunger assembly interacts with a pair of spaced detents in the rod, and includes a plunger having an end selectively engageable with the detents. A plunger spring is disposed for urging the plunger end toward and selectively into one of the detents. The plunger assembly includes an air control valve positioned for holding the end of the plunger away from the detents against the force of the plunger spring, while air pressure is applied to the valve.

The system further includes a poppet assembly which operates as a mechanical neutral lock-out device for positive engagement of a neutral position, and for insuring that during operation of a power take-off unit while the vehicle is stationary, the auxiliary will not slip into low or high gear upon failure of the air source. The poppet assembly includes a poppet pin disposed for engagement with a notch in the rod, wherein the notch includes a bottom portion and opposed cam surfaces on either side of the bottom portion. A poppet spring is disposed for urging the poppet pin into engagement with the notch, whereby upon shut-off of the air source, the poppet spring, although transversely disposed, will axially move the rod into the neutral position by forcing the poppet pin along one of the cam surfaces and into the bottom portion of the notch.

BRIEF DESCRIPTION OF THE DRAWINGS

FIG. 2 is a sectional view of an auxiliary shift rod mechanism which is selectively movable between low, neutral, and high gear positions in the auxiliary gearbox of FIG. 1; and FIG. 3 is an elevation of an auxiliary gearbox air control valve of the push-pull type, shown affixed to a shift column, the latter depicted only fragmentarily.

DETAILED DESCRIPTION OF A PREFERRED EMBODIMENT

Figure 1:
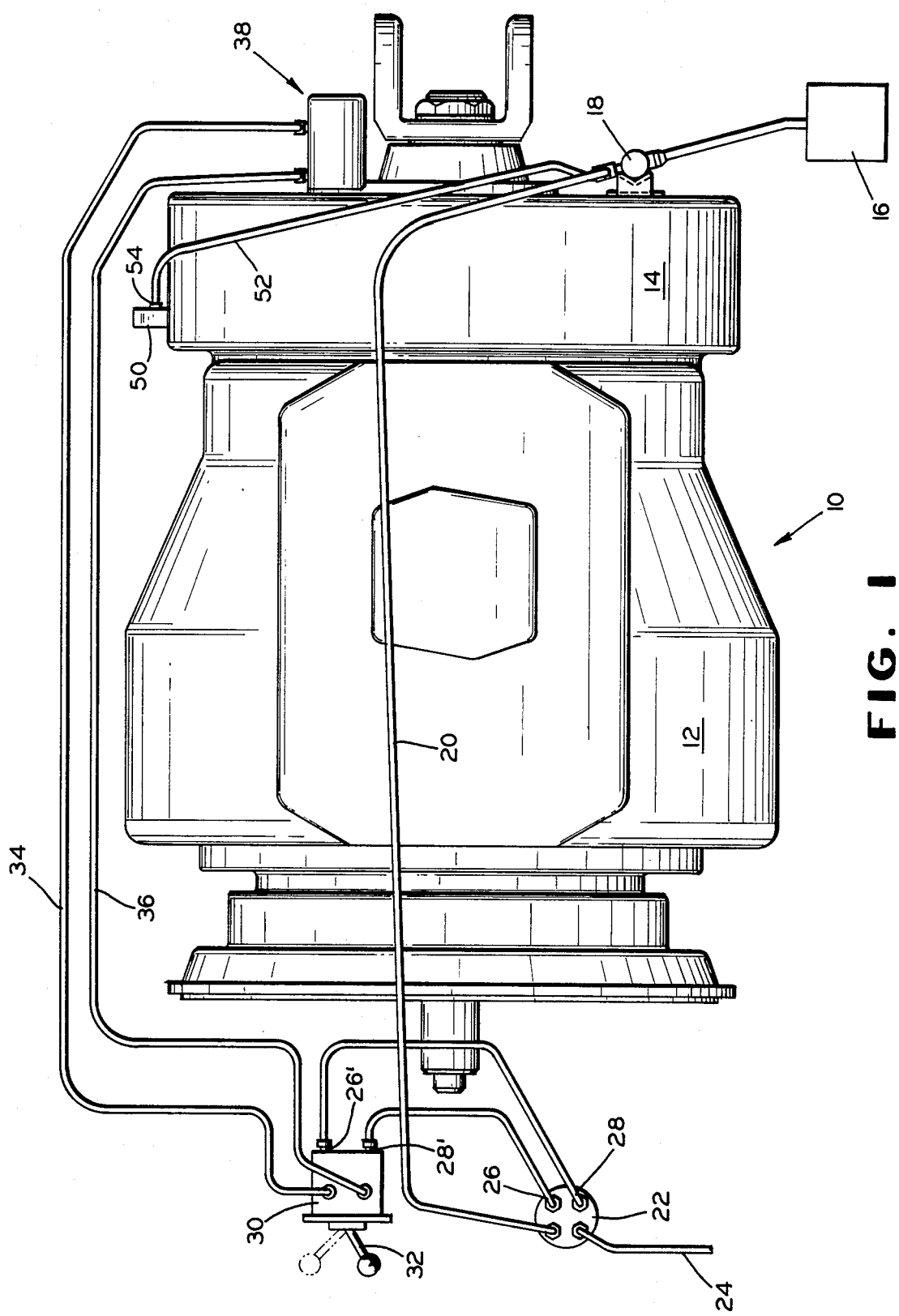
FIG. 1 is a schematic diagram of a compound transmission including a main and an auxiliary gearbox, the latter including the safety interlock system of the present invention.

Referring first to FIG. 1, a compound transmission assembly 10 is shown, which includes a main transmission gearbox 12 and an auxiliary air shifted gearbox 14 affixed to the main. In the embodiment herein described, the auxiliary gearbox 14 includes a high and a low speed gear (neither shown), wherein an air cylinder 38 is utilized to selectively move a shift rod 15 (FIG. 2) between the high and low gear positions. An intermediate or neutral shift position lies intermediate the above-referenced two auxiliary gear positions. An air source 16 (FIG. 1) provides compressed air through a pressure regulator 18 for supplying air through several air lines to various parts of the compound transmission assembly 10. Thus, a first air line 20 provides an air supply to an auxiliary gearbox air control valve 22 attached to a shift column 8 in the cab of a vehicle (see FIG. 3). The air valve 22 includes an exhaust port 24 as well as high and low auxiliary gear ports 26 and 28, respectively. The latter two ports are connected respectively to high and low gear ports 26' and 28' of an air valve 30.

The air valve 30, preferably for placement outside of the vehicle cab, provides a "mobile-stationary" selection device intermediate the valve 22 and cylinder 38 for power take-off operations commonly employed on vehicles having such compound transmission assemblies 10. A two-position lever 32 on the valve 30 is utilized to select between the "mobile" and "stationary" modes. To effect the stationary mode, the air supply is thus selectively shut off by movement of the lever 32 to either high or low gear air lines 34 and 36, and by the same valve movement both sides of the cylinder 38 are exhausted to atmosphere.

The air shift cylinder 38 includes a piston 40 more particularly shown in FIG. 2. Thus, it will be seen that in the "air-on" or "mobile" position of the lever 32, movement of a push-pull control 6 (FIG. 3) will effect a back-and-forth movement of the piston 40 which will, in turn, cause the shift rod 15 to move left and right between low and high gear positions. A shift fork 42 is mounted on the shift rod 15 to effectuate gear changes, as will be appreciated by those skilled in the art.

Referring now more particularly to FIG. 2, the air interlock system of the air actuated compound transmission shift rod 15 may now be described in detail.

A plunger assembly is shown at 50, wherein an air line 52 extends from the pressure regulator 18 (FIG. 1) to an inlet 54 of an air actuated plunger cylinder 56. The air line 52 supplies a normally constant air source to the underside of a piston 58 contained within the cylinder 56. The shift rod 15 contains a pair of spaced detents 64 and 66 for receiving a plunger 62 connected to the piston 58. The detent 64 represents the low auxiliary gear position, while the detent 66 represents the high auxiliary. Upon failure or loss of air pressure, a plunger spring 60 will cause the plunger 62 to be urged downwardly (as shown) into either the low or high gear detent 64 or 66, respectively (whichever gear is in position at time of failure), whereby the end 68 of the plunger 62 will be secured therein to prevent movement of the shift rod. Thus, the assembly 50 prevents a shift from either low or high gear to the neutral position upon failure of air supply to the cylinder 56. This feature prevents the possibility of a shift into neutral while the vehicle is moving, notwithstanding the failure of air to the compound transmission auxiliary gearbox.

A poppet assembly is shown at 70, including a poppet pin 72 disposed for interfacing a notch 74 in the shift rod 15. The poppet pin is urged by a poppet spring 76 into a bottom portion 78 of the notch 74 whenever the rod becomes free to move such as, for example, when air to the air shift cylinder 38 would be shut off. The notch 74 includes axially oriented cam surfaces 80 and 82 along either side of the bottom portion 78. The surfaces 80 and 82 provide for axial movement of the rod under transversely applied forces of the poppet spring 76, whenever the air to the cylinder 38 is interrupted.

The operation of the compound transmission auxiliary gearbox air interlock system of the present invention thus provides for shift rod movement safety in both the described mobile and stationary modes. The plunger assembly 50 provides a safety mechanism while the associated vehicle is in motion, hence during the time the 2-position lever 32 of the air valve 30 is in the "mobile" position. During the mobile mode, cylinder 38 will be "energized", and the air source 16 will be effective to permit the operator to shift between low and high gear positions of the auxiliary transmission by means of the push-pull control 6 on the auxiliary transmission air control valve 22. However, while the vehicle is stationary and the operator desires that the power take-off unit be employed, he will simply move the lever 32 into the "stationary" mode. The latter shift will cause the air sources through line 34 or 36 to be shut-off by means of the air valve 30, wherein air supplied to either side of the piston 40 will be exhausted to atmosphere. At that time, the poppet assembly 70 will become effective as hereinabove described to mechanically urge the shift rod 15 into the neutral position.

Although the invention has been described and shown in only one preferred embodiment, there are numerous variations which will fall within the scope of the appended claims.

What is claimed is:

1. In a transmission having a shift rod selectively movable between at least three positions including an intermediate neutral position, and air pressure means applied to an air cylinder for moving said rod between said positions; an improvement comprising: a plunger assembly for securing said rod against movement upon failure of said air pressure means to said plunger assembly comprising a pair of spaced detents in said rod, a plunger having an end selectively engageable with said detents, a first spring disposed for urging said end of said plunger toward and into one of said detents, and a piston positioned for holding said plunger end away from said detents against the force of said first spring whenever air pressure is applied to said piston; a poppet assembly for axially urging and holding said rod in said intermediate neutral position upon interruption of said air pressure to said cylinder comprising a notch in said rod, said notch having a bottom portion and opposed cam surfaces on either side of said bottom portion, a poppet pin engageable with said notch, and a second spring disposed for urging said poppet pin into engagement with said notch, whereby upon interruption of said air pressure to said poppet assembly, said second spring will force said poppet pin along one of said cam surfaces and into said bottom portion of said notch.

2. A compound transmission including a main gearbox and an auxiliary gearbox, said auxiliary gearbox including a shift rod for shifting gears and an air pressure source for axially moving said shift rod between said gears, said shift rod comprising at least two axially aligned and closely spaced detents and a notch axially spaced apart from said detents, said notch defining a pair of cam surfaces and a bottom portion between said cam surfaces, said auxiliary gearbox further comprising a safety interlock system comprising a plunger assembly including a plunger extending transversely to said shift rod and engageable with each of said shift rod detents, said plunger assembly including a piston in communication with said air pressure source and a plunger spring biasing said plunger against said air pressure source, said interlock system further comprising a poppet assembly including a poppet pin extending transversely to said shift rod, said poppet pin in engagement with said notch, said poppet pin including a poppet spring biasing said poppet pin toward said notch, wherein upon shut off of said air pressure source to said poppet assembly, said poppet spring urges said poppet pin against either of said cam surfaces of said notch thereby axially moving said shift rod until said pin comes to rest in said bottom portion of said notch intermediate said cam surfaces, and wherein upon a loss of said air pressure source to said plunger assembly, said plunger spring is operative to urge and hold said plunger in one of said detents.

3. The transmission of claim 2 wherein said plunger spring applies a force on said piston less than an opposing force thereon by said air pressure source, whereby said plunger spring prevents said shift rod from moving into said neutral position when said air pressure source fails.

4. The transmission of claim 3 further comprising an air shift cylinder, and a 2-position exhaust air valve positioned intermediate said air pressure source and said air shift cylinder.

5. The transmission of claim 4 wherein said air shift cylinder comprises a second piston, and wherein one end of said shift rod is affixed to said second piston, whereby said pressure source may be applied to either side of said second piston to effect a shift of said rod.

6. The transmission of claim 5 wherein said shift rod further comprises a shift fork positioned intermediate said pair of detents and said notch, whereby said air cylinder is operative to move said shift fork between said three positions.

* * * * *